United States Patent
Nagpal et al.

(10) Patent No.: US 7,054,630 B2
(45) Date of Patent: May 30, 2006

(54) SELECTIVE PROCESSING OF THE COMMON CONTROL CHANNEL

(75) Inventors: Vikas Nagpal, Encinitas, CA (US); Francesco Grilli, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 545 days.

(21) Appl. No.: 10/144,972

(22) Filed: May 13, 2002

(65) Prior Publication Data
US 2003/0211846 A1 Nov. 13, 2003

(51) Int. Cl.
*H04Q 7/20* (2006.01)

(52) U.S. Cl. ............. 455/434; 455/435.1; 455/458; 455/515; 455/574; 340/7.32; 340/7.33; 370/311

(58) Field of Classification Search ............ 455/574, 455/435.1, 515, 458; 340/7.32, 7.33; 370/311
See application file for complete search history.

(56) References Cited

U.S. PATENT DOCUMENTS

| 5,826,173 | A  | * | 10/1998 | Dent ............. 340/7.38 |
| 6,108,542 | A  | * | 8/2000  | Swanchara et al. ..... 455/434 |
| 6,300,864 | B1 | * | 10/2001 | Willey .......... 340/7.43 |
| 6,639,907 | B1 | * | 10/2003 | Neufeld et al. ..... 370/342 |
| 6,721,566 | B1 | * | 4/2004  | Longoni et al. ..... 455/436 |

\* cited by examiner

*Primary Examiner*—Temica Beamer
(74) *Attorney, Agent, or Firm*—Philip R. Wadsworth; Thien T. Nguyen; Rupit Patel (57) ABSTRACT

Methods and apparatus are presented to reduce the amount of processing required by a remote station to successfully decode the Common Control Channel (CCCH). During periods when a remote station does not implement any update requests, CCCH messages are discarded. During periods when a remote station implements update requests, CCCH messages are fully processed. The selective processing of CCCH messages produces a corresponding savings in power consumption.

22 Claims, 7 Drawing Sheets

SELECTIVE PROCESSING OF THE COMMON CONTROL CHANNEL

BACKGROUND

1. Field

The present invention relates generally to wireless communications, and more specifically, to the selective processing of a downlink common control channel.

2. Background

The field of wireless communications has many applications including, e.g., cordless telephones, paging, wireless local loops, personal digital assistants (PDAs), Internet telephony, and satellite communication systems. A particularly important application is cellular telephone systems for remote subscribers. As used herein, the term "cellular" system encompasses systems using either cellular or personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA. Another CDMA standard is the W-CDMA standard, as embodied in $3^{rd}$ *Generation Partnership Project "3GPP"*, Document Nos. 3G TS 25.211, 3G TS 25.212, 3G TS 25.213, and 3G TS 25.214.

Transmissions between component parts of a WCDMA system can be sent in a time division duplex mode (TDD) or a frequency division duplex mode (FDD), in accordance with the frequency bands available to a service provider. Due to the complexity of permitting operations in either mode, the system transmits information in accordance with logical channels and physical channels. Data is encoded and interleaved according to the logical channel to which the data is assigned, and the logical channels are then mapped onto physical channels. The number and types of logical channels and physical channels vary depending upon the direction the signal is being sent. Transmissions from the remote station (also known as a mobile station) to the base station are referred to as the "uplink" and the transmissions from the base station to the remote station are referred to as the "downlink."

On the downlink, the logical channels are classified as control channels or traffic channels. Control channels are the Broadcast Control Channel (BCCH), Paging Control Channel (PCCH), Dedicated Control Channel (DCCH), Common Control Channel (CCCH), and the Shared Channel Control Channel (SHCCH). Traffic channels are the Dedicated Traffic Channel (DTCH) and the Common Traffic Channel (CTCH).

The embodiments described below are directed towards the selective processing of the CCCH by a remote station. Presently, a WCDMA system is designed so that the CCCH is common amongst all remote stations operating within the range of a serving base station, provided that the remote stations have been assigned common transport channels in uplink and in downlink. Hence, all remote stations that are using uplink and downlink common transport channels must demodulate and decode all messages on the CCCH. If a message is not specifically targeted towards a remote station, then the remote station must discard the message. For example, if the serving base station transmits 100 individual messages to 100 individual remote stations on the CCCH, then each remote station would demodulate and decode all 100 messages, of which 99 irrelevant messages would be discarded as being targeted for another.

The above requirement to demodulate and decode all messages on the CCCH is wasteful of processing resources, but the requirement is implemented in order to solve the problem of providing update information to a remote station. The CCCH is used to exchange signaling information when the DCCH is not available, which occurs after a cell reselection, for example. Messages on the CCCH typically comprise update information that will allow a remote station to continue processing targeted messages received on the DCCH and allow the allocation of dedicated transport channels to the remote station.

The embodiments that are described herein are for reducing the need of a remote station to demodulate and decode all messages on the CCCH, so that the amount of processing resources required to successfully decode the CCCH is reduced. The CCCH is successfully decoded if a remote station can determine information specifically targeted to itself on the CCCH. If the remote station need not demodulate and decode all irrelevant CCCH messages, then a corresponding savings in power consumption is produced, which is beneficial to the battery life of the remote station.

SUMMARY

Methods and apparatus are presented herein to address the above stated needs. In one aspect, a method is presented for selectively processing a common control channel (CCCH) at a remote station, comprising: determining whether an indicator for a received message indicates that the received message is a CCCH message; if the received message is not a CCCH message, then processing the received message; if the received message is a CCCH message, then determining whether a response to a request by the remote station is expected; if a response to a request by the remote station is expected, then processing the CCCH message; and if a response to a request by the remote station is not expected, then not processing the CCCH message.

In another aspect, apparatus is presented for executing a set of instructions performing the above-mentioned method, the apparatus comprising a memory element and a processor.

In another aspect, a method is presented for processing a common control channel (CCCH) at a remote station, comprising: transitioning to a first state if the remote station transmits a request to a base station, wherein the first state is for processing any message received on the CCCH; and transitioning to a second state if a response to the request is successfully processed by the remote station, wherein the second state is for discarding any message received on the CCCH.

In another aspect, a method is presented for processing any message received on the CCCH if the remote station is in a first state, wherein the remote station enters the first state if the remote stations transmits a request to a base station; and discarding any message received on the CCCH if the remote station is in a second state, wherein the remote station enters the second state if the remote station receives a response to a request that had been previously transmitted to a base station.

In another aspect, an apparatus for selectively processing a CCCH comprises: means for transitioning to a first state if the remote station transmits a request to a base station; means for processing any messages received on the CCCH by the remote station while the remote station is in the first state; means for transitioning to a second state if a response to the request is successfully processed by the remote station; and means for discarding any messages received on the CCCH by the remote station while the remote station is in the second state.

DETAILED DESCRIPTION

Figure 1:
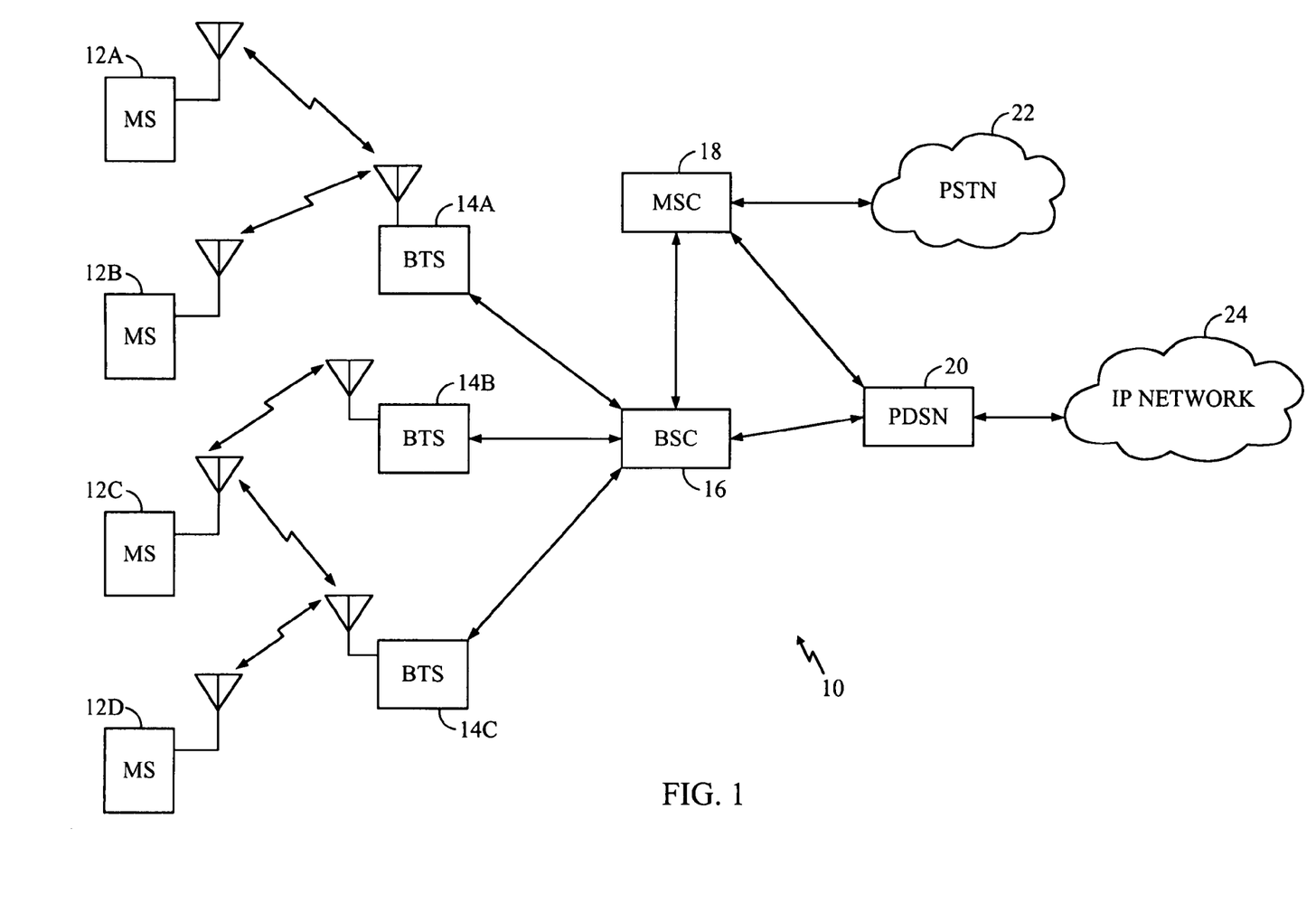
FIG. 1 is a diagram of a wireless communication network.

As illustrated in FIG. 1, a wireless communication network 10 generally includes a plurality of remote stations (also called subscriber units or mobile stations or user equipment) 12a–12d, a plurality of base stations (also called base station transceivers (BTSs) or Node B). 14a–14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four remote stations 12a–12d, three base stations 14a–14c, one BSC 16, one MSC 18, and one PDSN 20 are shown. It would be understood by those skilled in the art that there could be any number of remote stations 12, base stations 14, BSCs 16, MSCs 18, and PDSNs 20.

In one embodiment the wireless communication network 10 is a packet data services network. The remote stations 12a–12d may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, remote stations may be any type of communication unit.

The remote stations 12a–12d may advantageously be configured to perform one or more wireless packet data protocols such as described in, for example, the EIA/TIA/IS-707 standard. In a particular embodiment, the remote stations 12a–12d generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), Internet Protocol (IP), Point-to-Point Protocol (PPP), Frame Relay, High-bit-rate Digital Subscriber Line (HDSL), Asymmetric Digital Subscriber Line (ADSL), or other generic digital subscriber line equipment and services (xDSL). In an alternate embodiment, the BSC 16 is coupled directly to the PDSN 20, and the MSC 18 is not coupled to the PDSN 20.

During typical operation of the wireless communication network 10, the base stations 14a–14c receive and demodulate sets of uplink signals from various remote stations 12a–12d engaged in telephone calls, Web browsing, or other data communications. Each uplink signal received by a given base station 14a–14c is processed within that base station 14a-14c. Each base station 14a-14c may communicate with a plurality of remote stations 12a–12d by modulating and transmitting sets of downlink signals to the remote stations 12a–12d. For example, as shown in FIG. 1, the base station 14a communicates with first and second remote stations 12a, 12b simultaneously, and the base station 14c communicates with third and fourth remote stations 12c, 12d simultaneously. The resulting packets are forwarded to the BSC 16, which provides call resource allocation and mobility management functionality including the orchestration of soft handoffs of a call for a particular remote station 12a–12d from one base station 14a–14c to another base station 14a–14c. For example, a remote station 12c is communicating with two base stations 14b, 14c simultaneously. Eventually, when the remote station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In a WCDMA system, the terminology of the wireless communication system components differs, but the functionality is the same. For example, a base station can also be referred to as a Radio Network Controller (RNC) operating in a UTMS Terrestrial Radio Access Network (U-TRAN), wherein "UTMS" is an acronym for Universal Mobile Telecommunications Systems.

Figure 2:
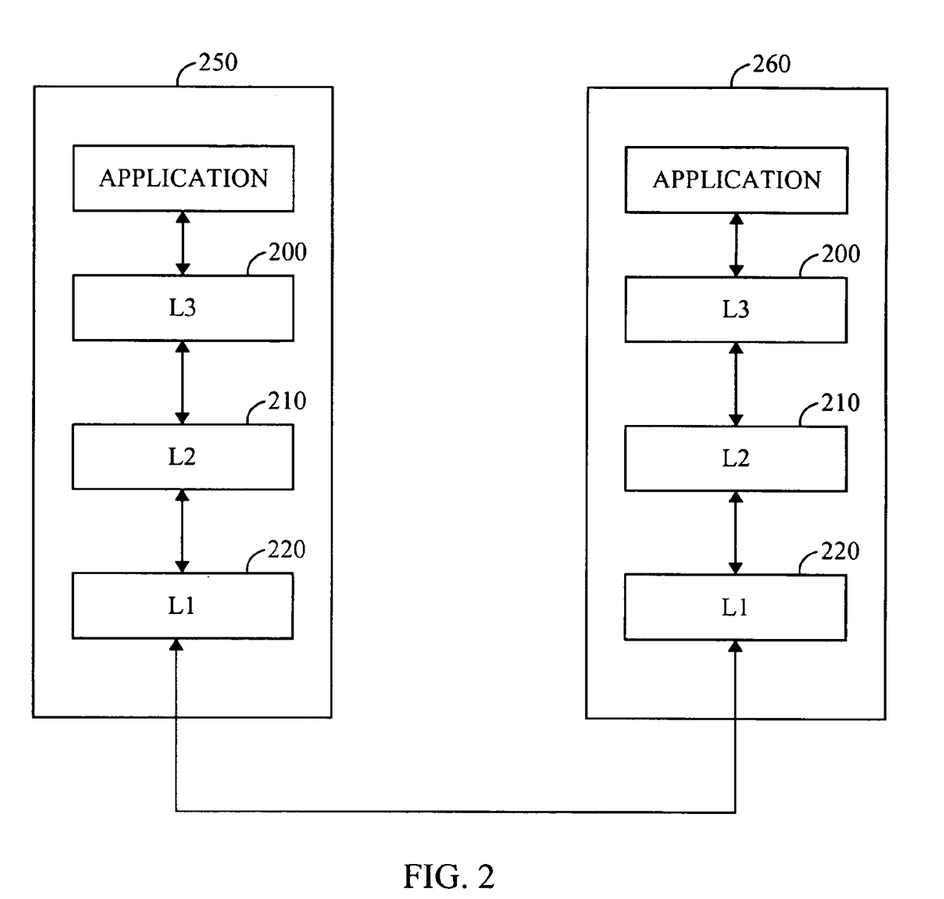
FIG. 2 is a general block diagram of the Radio Interface Protocol Architecture.

FIG. 2 is a block diagram of the Radio Interface protocol architecture for a remote station (referred to alternatively as user equipment or mobile stations herein) operating in a WCDMA environment. The protocol architecture is functionally defined by layers. Layering is a method for organizing communication protocols in well-defined encapsulated data units between otherwise de-coupled processing entities, i.e., layers. FIG. 2 illustrates three protocol layers L1 220, L2 210, and L3 200 implemented in both a base station 250 and a remote station 260. Layer L1 220 provides for the transmission and reception of radio signals between the base station and remote station, layer L2 210 provides for the correct transmission and reception of signaling messages, and layer L3 200 provides for the control messaging for the communication system. Layer L3 200 originates and terminates signaling messages according to the semantics and timing of the communication protocol between the base station 250 and the remote station 260. In a WCDMA system, L1 is referred to as the Physical Layer, while L2 comprises the Medium Access Control (MAC) Layer, the Radio Link Control (RLC) Layer, the Broadcast Multicast Control (BMC) Layer, which is used for Broadcast Short Message Service (SMS) and the Packet Data Convergence Protocol (PDCP) Layer, which is an optional layer that allows lossless RNC reselection. L3 is referred to as the Radio Resource Control (RRC) Layer or alternatively, the Signaling Layer. The message entities transported between the layers are referred to as packet data units (PDU) and service data units (SDU).

The MAC Layer operates upon transport channels that are defined between the MAC Layer and the Physical Layer (L1) and upon logical channels that are defined between the MAC Layer and the RLC Layer, both of which are part of L2. Hence, in a general description, it can be said that a transport channel sits above a physical channel and below a logical channel. The presence of transport channels allows extra functional flexibility, which will not be described further herein. The MAC Layer provides data transfer services on logical channels, and each logical channel type is defined by what type of information is being transferred. Logical channels are categorized into control channels and traffic channels. The control channels are for transferring control information, such as handover messages, cell update messages, and corresponding responses to said messages. Traffic channels are used to transfer user-originated information, such as voice traffic and data traffic.

Figure 3:
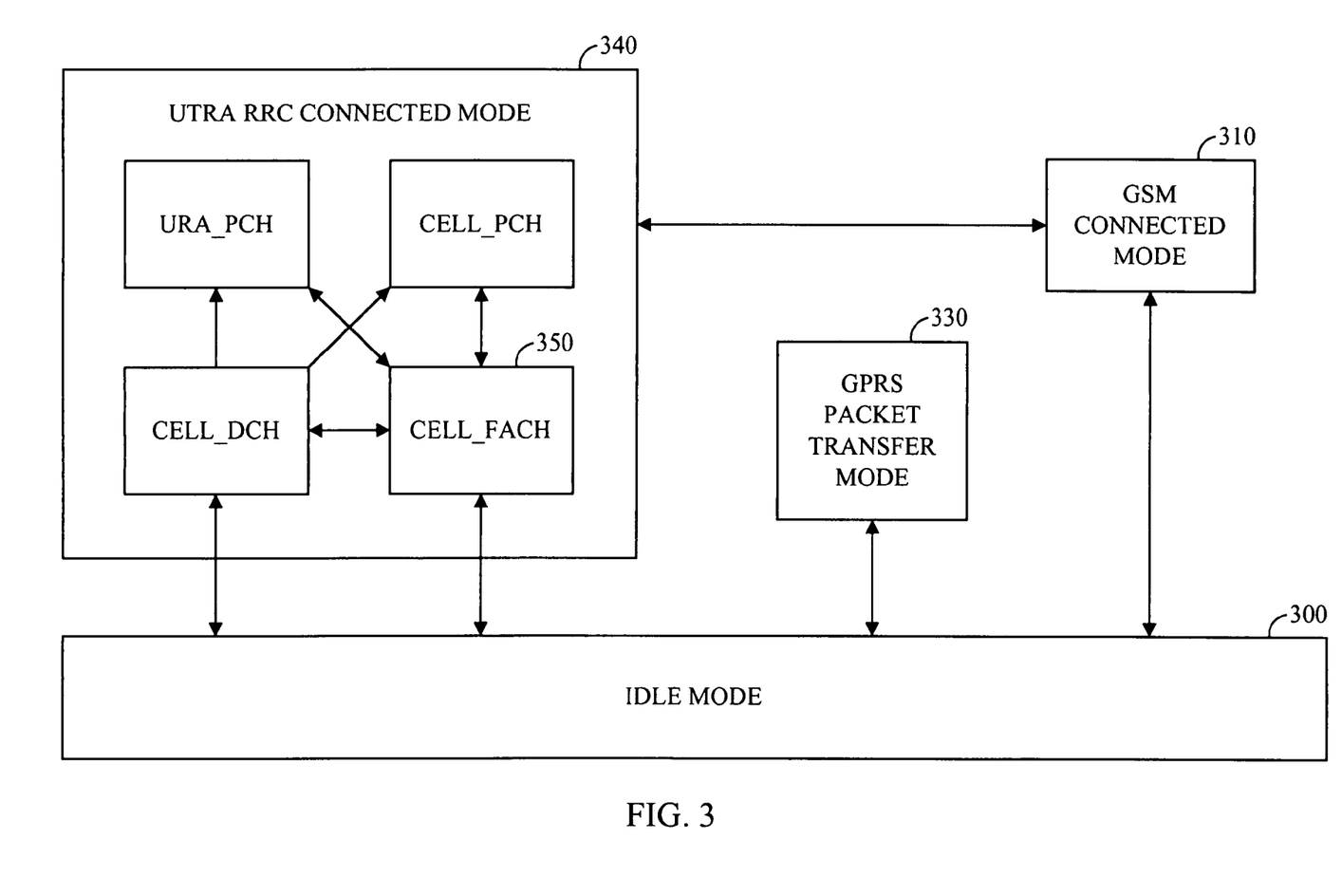
FIG. 3 is a block diagram of the operational states in a WCDMA-compliant remote station.

The protocol architecture described above allows a remote station to exist in four RRC states: Idle Mode 300, GSM Connected Mode 310, General Packet Radio Service (GPRS) Packet Transfer Mode 330, and UTRA RRC Connected Mode 340, as shown in FIG. 3. In each state, only specified logical channels and transport channels function. The embodiments described herein are directed towards the CELL_FACH state 350 in the UTRA RRC Connected Mode 340, and the logical channels operating within the CELL_FACH state 350.

The CELL_FACH state can be used for low traffic services (i.e. SMS) and for maintaining up-to-date system information, which is broadcast by a serving base station (also referred to as a cell or UTRA). The CELL_FACH state is further for:

Sending and receiving small amounts of user data;
performing base station reselection processes;
performing measurement processes according to measurement control information;
running periodic cell update timers;
listening to all FACH transport channels mapped on the Secondary Common Control Physical Channel (S-CCPCH) selected by the remote station;
acting on RRC messages received on the BCCH, CCCH, or the DCCH; and
acting on RRC messages received on SHCCH, if the SHCCH is available.

In the CELL_FACH state, there are three control channels that always operate, with continuous reception. The three control channels are the Dedicated Control Channel (DCCH), the Broadcast Control Channel (BCCH), and the Common Control Channel (CCCH). As implied by the name, the DCCH is a dedicated channel, which is used to convey instructions for hand-off from one base station to another base station and for setting up physical and logical channels. The BCCH is for broadcasting system updates to the remote stations operating within the range of the broadcasting base station. Both DCCH and BCCH carry messages for targeted remote stations. Each message on the DCCH carry an identification of a targeted remote station, referred to as User Equipment Identification (UE_ID), in a MAC header attached to the message. Hence, each remote station need only process the MAC header of each message in order determine whether the remote station is the intended recipient of a message.

Since an UE_ID needs to the carried in each message block, it is desirable from a system perspective to use short UE_IDs, which reduces the amount of processing needed to decode the identifiers. However, due to the ubiquitousness of wireless telephony, a long Mobile Identification Number (MIN) is needed to identify each remote station uniquely. A MIN is assigned to a remote station upon the manufacture of the remote station or the service provisioning.

In the WCDMA system, a naming convention has been developed wherein two temporary names are generated by the radio network for each remote station operating within the system. A short UE_ID, referred to as a Cell-Radio Network Temporary Identifier (C-RNTI), and a long UE_ID, referred to as a UTRAN-Radio Network Temporary Identifier (U-RNTI), are generated. The short C-RNTI is valid only for a particular cell, and must be re-acquired by a remote station when moving from one cell to another cell. The long U-RNTI is a temporary system identifier that is valid between cells of the system.

Hence, the DCCH messages are constructed with a short C-RNTI in the MAC header, so that all the remote stations need to read the MAC header, but only an intended recipient needs to process a complete DCCH message. However, when a remote station moves to another cell, the remote station must re-acquire a new C-RNTI value. The CCCH is used to convey this information to remote stations.

A CCCH message does not carry UE_ID information in the MAC header because the CCCH channel is for transmitting information to remote stations that do not have accurate C-RNTI information. The CCCH message carries the long U-RNTI information and updated C-RNTI information as data payload in the message itself. Hence, the CCCH is designed so that each and every remote station in the range of the serving base station must receive and process each and every CCCH message. Once a message is received, demodulated and decoded, each remote station must make a determination as to whether the U-RNTI information identifies the remote station as the intended recipient. If not, then the remote station must discard the message and moreover, the remote station must decrement a sequence counter that had just been incremented with the arrival of the message. If the long U-RNTI information identifies the remote station as the intended recipient, then the remote station updates itself using the new C-RNTI that was also carried in the payload.

The embodiments described herein are for eliminating the waste associated with the above processing of the CCCH. The embodiments are for altering the processes at a remote station, rather than re-configuring the already existing downlink CCCH.

In one embodiment, a scheme for selective processing of the CCCH channel is presented, wherein a non-identification indicator in a received CCCH message is used in combination with a pre-knowledge of expected CCCH messages to determine whether to process or discard the received CCCH message.

In another embodiment, a scheme for selective processing of the CCCH channel is presented, wherein a non-identification indicator in a received CCCH message is used in combination with a plurality of sub-states, which are functionally defined for determining whether to process or discard a received CCCH message.

In general, the embodiments described herein are directed towards using a discriminating indicator in the MAC header of the CCCH messages to process only those messages that are actually expected by a remote station. Hence, when a remote station does not expect any message directed to itself on a CCCH, then all RLC PDUs for the CCCH logical entity can be dropped in the MAC Layer of the remote station. One direct benefit of the embodiments is that the amount of processing that involves removing RLC headers from the received PDUs and reassembling RLC SDUs is reduced. A reduction in processor operations correspondingly leads to a reduction in power consumption by the processor.

Figure 4:
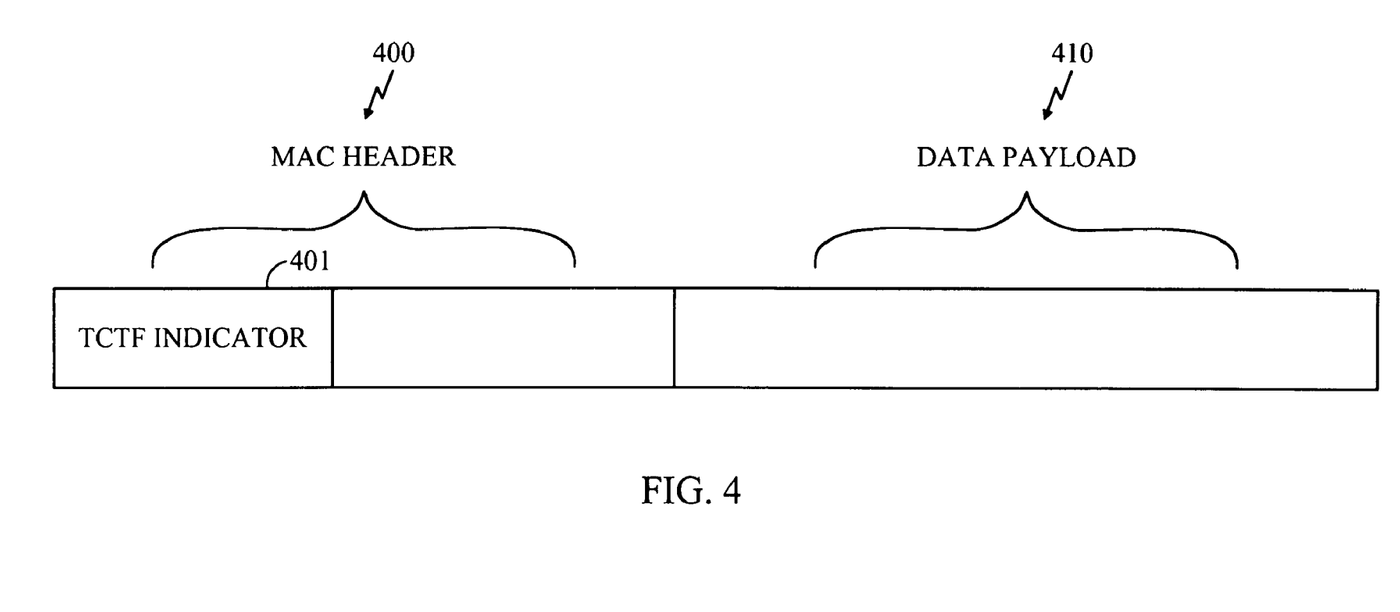
FIG. 4 is a diagram of message fields.

In one aspect of the embodiments, a discriminator in the MAC header referred to as the Target Channel Type Field (TCTF) is analyzed. FIG. 4 is a general diagram of message fields. MAC header 400 accompanies data payload 410. A TCTF field 401 is located generally at the front of the MAC header 400. The TCTF is used by a remote station to identify whether the received message carries BCCH, CCCH, CTCH, SHCCH, or dedicated logical channel information. For example, a TCTF value of "000" could indicate that the designation of the message type would be a BCCH message, and a TCTF value of "001" could indicate that the designation of the message type would be a CCCH message.

Figure 5:
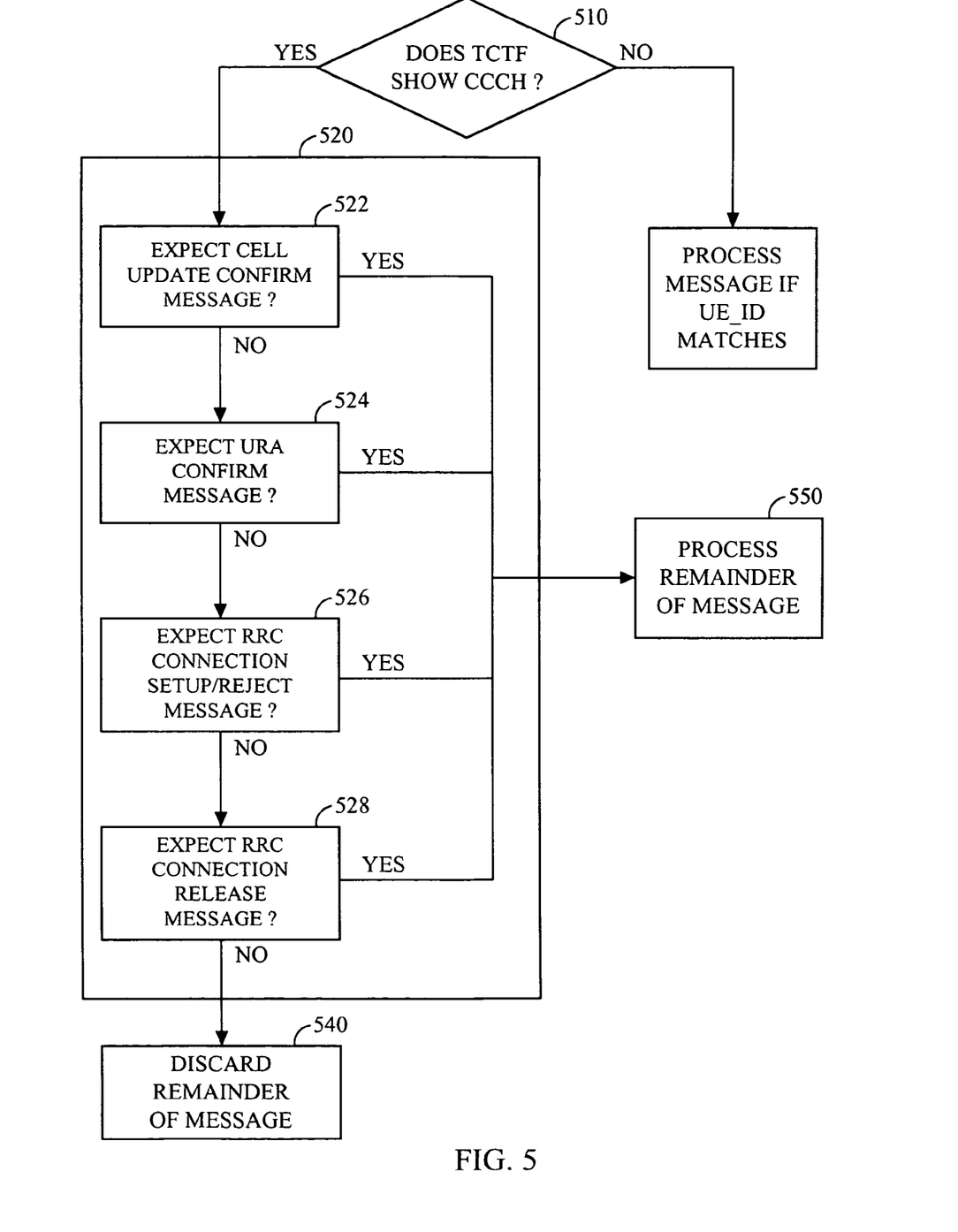
FIG. 5 is a flowchart of a method for selectively processing CCCH messages.

In one embodiment, a processor and memory element are configured to perform a method for determining whether a received message should be completely decoded or not. FIG. 5 is a flowchart illustrating the procedure. At step 510, a discriminator field of the MAC header is checked. In one aspect of the embodiment, the TCTF field is the discriminator field to be checked. If the TCTF indicates that the message is a CCCH message, then the program flow proceeds to step 520. If the TCTF indicates that the message is not a CCCH message, then the program flow proceeds to step 530, wherein the message is processed according to message type.

At step 520, the processor determines whether a RRC message is expected on the CCCH. If a RRC message is not expected, then the program flow proceeds to step 540, wherein the processor discards the remainder of the CCCH message. If a RRC message is expected, then the program flow proceeds to step 550, wherein the processor processes the remainder of the CCCH message.

In one aspect of the embodiment, the step of 520 further comprises additional steps, such as:

At step 522, determining whether a CELL UPDATE CONFIRM message is expected. A CELL UPDATE CONFIRM message is a response to the remote station when the remote station requests a cell update message from a base station.

At step 524, determining whether a URA (U-TRAN Registration Area) UPDATE CONFIRM message is expected. A URA UPDATE CONFIRM message is a response to the remote station when the remote station requests a URA update.

At step 526, determining whether a RRC CONNECTION SETUP/REJECT message is expected. A RRC CONNECTION SETUP/REJECT message is a response to the remote station when the remote station transmits a RRC connections request message.

At step 528, determining whether a RRC CONNECTION RELEASE message is expected. A RRC CONNECTION RELEASE message can be transmitted by a base station to a remote station at any time and is used to transition the remote station into the Idle Mode.

It should be noted that although the WCDMA standard allows the RRC CONNECTION RELEASE message to be transmitted by a base station to a remote station on the CCCH at any time, the reality of the RRC CONNECTION RELEASE usage is such that the base station transmits the RRC CONNECTION RELEASE in response to an update request by the remote station. The WCDMA standard states that the RRC CONNECTION RELEASE message must be sent on the downlink DCCH, if available, and could be sent on the CCCH if the downlink DCCH is not available. Non-availability of the short C-RNTI could be the only reason why the downlink DCCH is not available while the remote station is in the CELL_FACH state. If the short C-RNTI is not available to the remote station, the remote station would transmit an update request to the base station. Hence, the remote station would be expecting a response from the base station and the embodiments described herein are operable.

Another, very unlikely reason for a base station to use the CCCH rather than the DCCH for a RRC CONNECTION RELEASE message is when the base station loses the short C-RNTI. This is a very unlikely event since it implies the complete operational failure of the base station. If this occurs, the base station would re-acquire the long U-RNTI of a remote station from a neighboring base station and send a RRC CONNECTION RELEASE message on the CCCH to that remote station. If one of the embodiments is implemented, then the target remote station would discard the RRC CONNECTION RELEASE message. However, the target remote station would eventually perform a cell update procedure due to cell reselection or due to the expiration of a periodic cell update timer.

Since the base station assumes that the target remote station is already in the Idle Mode (due to the prior transmission of the RRC CONNECTION RELEASE message), the U-RNTI in the update request from the remote station would not be recognized. The use of an incorrect U-RNTI would cause the base station to reply to the update request on the CCCH. Since a reply is expected to the update request, the remote station would be processing all CCCH messages until the arrival of a reply. Hence, the remote station would be in the wrong state for a short duration, but would eventually return to the correct state.

In the above embodiment, the processor performs the program flow for each message that the remote station receives. It should be noted that the order of the method steps described above for determining whether a message is expected can be interchanged without affecting the scope of the embodiments. An alternative embodiment can be implemented using a state machine in two states, so that all CCCH messages received while the remote station is in a first state are completely decoded and all CCCH messages received while the remote station is in a second state are completely discarded.

Figure 6:
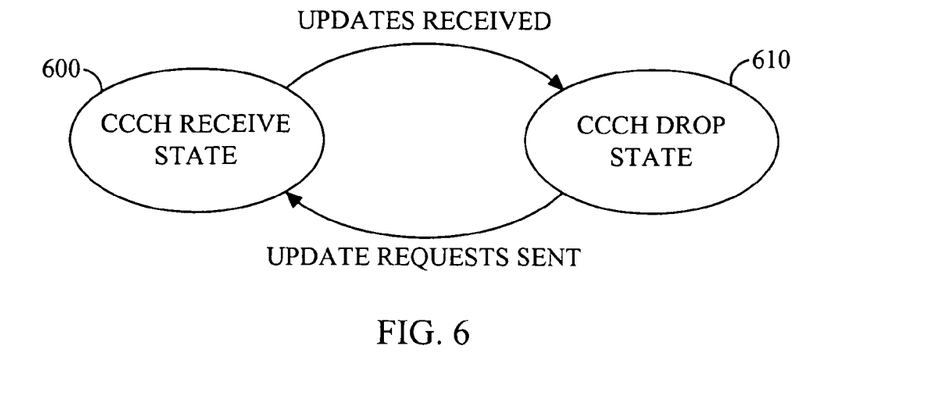
FIG. 6 is a state diagram of an embodiment for selectively processing the CCCH.

FIG. 6 is a diagram of the embodiment using the state method. In the CCCH RECEIVE state 600, the remote station completely processes any message with the TCTF indicator for the CCCH. Once a CCCH message is received, the remote station transitions into the CCCH DROP state 610. In the CCCH DROP state 610, the remote station completely discards any message with the TCTF indicator for the CCCH. The remote station transitions into the CCCH RECEIVE state 600 when the remote station transmits a RRC message, such as a request for information or updates, to a base station.

Embodiments Encompassing Integrity Protection Schemes

The above embodiments can be implemented in WCDMA systems using integrity protection schemes that do not increment sequence numbers of message repetitions. However, alternative embodiments should be implemented in WCDMA systems that use incremented sequence numbers in the integrity protection schemes. In some integrity protection schemes, sequence numbers are attached to message repetitions and are used to update a counter at the base station and a counter at the remote station. The contents of the counters are then used to generate message authentication codes (MACs), which are used to show that the contents of the message originated from the stated originator and that the contents of the message have not been altered.

In the WCDMA system, the downlink CCCH is a common channel. Hence, downlink messages are always sent in an unacknowledged mode on this channel, and are sent in a transparent mode on the uplink. In an unacknowledged mode, the base station does not receive any acknowledgments as to whether an intended recipient actually received a CCCH message. In order to ensure that an intended recipient actually receives a CCCH message, a process called "quick repeat" is implemented, wherein the CCCH message is repeatedly transmitted in a short interval of time. The repeated CCCH messages can be either be identical or the repeated CCCH messages can differ by a changing sequence number, which is incremented at each repetition.

In one implementation of a WCDMA system, the integrity protection scheme uses a counter value to generate the MAC, wherein the counter value comprises the changing sequence number as the least significant bits and a hyper frame number as the most significant bits. The changing sequence number is public, since it is transmitted over-the-air, and the hyper frame number is independently maintained and held private by each entity, for security and efficiency purposes. However, when the changing sequence number rolls over, for example, a rollover every 16 RRC messages, the hyper frame number is incremented.

If a receiving entity misses or ignores more than the rollover number of RRC messages, then the hyper frame number at the receiving entity will be out of synch with the hyper frame number at the transmitting entity. If a synchronization problem occurs, then all subsequent messages will fail the integrity check, which will result in the loss of the RRC connection, i.e., a dropped call.

Figure 7:
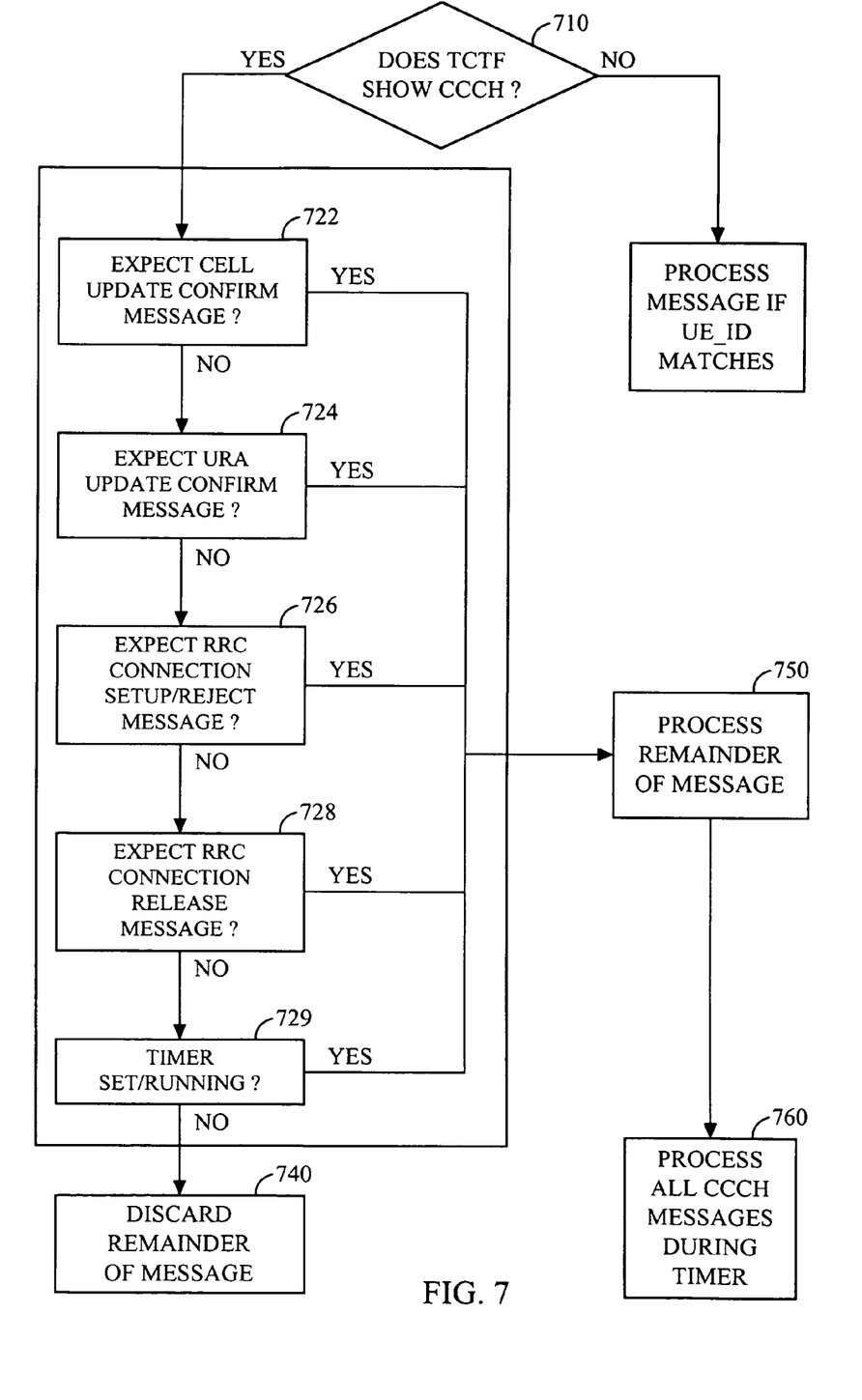
FIG. 7 is a flowchart of a method for selectively processing CCCH messages.

In order the address the problem presented above, which may occur only if the radio network increments the RRC sequence number of each repeated message, further features can be added to the embodiments above to maintain message integrity. In one alternative embodiment, a timer is configured so that the integrity check of all repeated messages are considered. FIG. 7 is a flowchart illustrating the procedure.

At step 710, the TCTF field of the MAC header is checked. If the TCTF indicates that the message is a CCCH message, then the program flow proceeds to step 720. If the TCTF indicates that the message is not a CCCH message, then the program flow proceeds to step 730, wherein the message is processed according to message type.

At step 720, the processor determines whether a RRC message is expected on the CCCH. If a RRC message is not expected, then the program flow proceeds to step 740, wherein the processor discards the remainder of the CCCH message. If a RRC message is expected, then the program flow proceeds to step 750, wherein the processor processes the remainder of the CCCH message. At step 760, the processor continues processing all CCCH messages received during the duration of a timer, which had been set upon receipt of an expected RRC message. It should be understood that the timer could be set for any arbitrary amount, for example, 2 seconds. If the timer is deactivated, then this embodiment is appropriate for use in a system that does not use sequential numbers to perform the integrity procedure.

In one aspect of the embodiment, the step of 720 further comprises additional steps, such as:

At step 722, determining whether a CELL UPDATE CONFIRM message is expected. A CELL UPDATE CONFIRM message is a response to the remote station when the remote station requests a cell update message from a base station.

At step 724, determining whether a URA (U-TRAN Registration Area) UPDATE CONFIRM message is expected. A URA UPDATE CONFIRM message is a response to the remote station when the remote station requests a URA update.

At step 726, determining whether a RRC CONNECTION SETUP/REJECT message is expected. A RRC CONNECTION SETUP/REJECT message is a response to the remote station when the remote station transmits a RRC connections request message.

At step 728, determining whether a RRC CONNECTION RELEASE message is expected. A RRC CONNECTION RELEASE message can be transmitted by a base station to a remote station at any time and is used to transition the remote station into the Idle Mode.

At step 729, setting a timer, or alternatively, if the timer has already been set, determining whether the timer has expired.

It should be noted that the order of the method steps described above for determining whether a message is expected can be interchanged without affecting the scope of the embodiments.

An alternative embodiment can be implemented using a state machine in two states and a timer, so that all CCCH messages received while the remote station is in a first state are completely decoded and all CCCH messages received while the remote station is in a second state are completely discarded.

Figure 8:
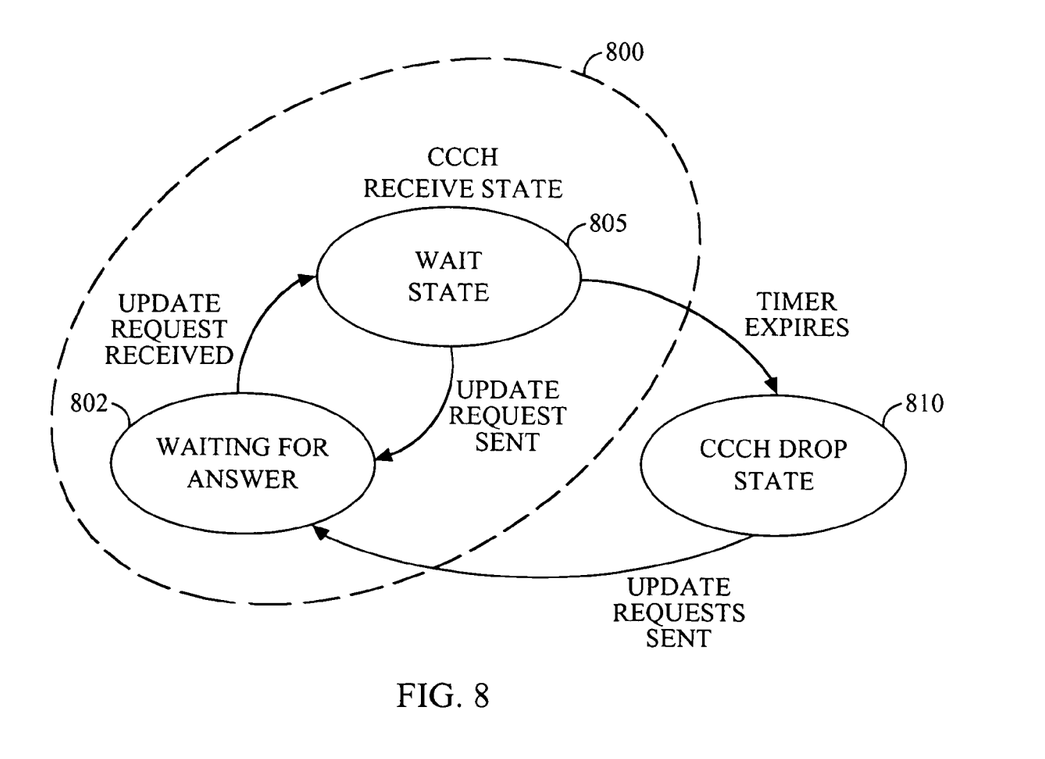
FIG. 8 is a state diagram of an embodiment for selectively processing the CCCH.

FIG. 8 is a diagram of the embodiment using the state method. In the CCCH RECEIVE state 800, the remote station waits for a CCCH message in a WAITING FOR ANSWER mode 802 and completely processes any message with the TCTF indicator for the CCCH that arrives. Once a CCCH message is received, the remote station transitions into a WAIT state 805, wherein the remote station processes any message with the TCTF indicator for the CCCH during the duration of a timer. The timer can be set for any predetermined duration. Upon the expiration of the timer, the remote station transitions into the CCCH DROP state

810. If a new RRC message is expected while in the WAIT state 805, the remote station transitions back into a WAITING FOR ANSWER mode 802 of the CCCH RECEIVE state 800. In the CCCH DROP state 810, the remote station completely discards any message with the TCTF indicator for the CCCH. The remote station transitions into the CCCH RECEIVE state 800 when the remote station transmits a RRC message, such as a request for information or updates, to a base station.

It should be understood that the WAIT state 805 could be separated from the CCCH RECEIVE state 800 in an alternative implementation of the embodiment, which is not shown.

In a system that does not use changing sequence numbers for the quick repeats, the remote station can use the timer-less embodiments or the embodiments with timers set to "0" to reduce processing resources. Once a successful decode of the CCCH message is accomplished, the remote station can use the timer-less embodiments or the embodiments with timers set to "0" to discard the subsequent repetitions as well as the non-intended CCCH messages.

In addition to the reduction or processing resources, another benefit produced by the present embodiments is the reduced operation of the counters. It should be noted that in the current WCDMA standard, a sequence counter is incremented each time a determination is made that a CCCH message has arrived. Upon decoding, if the remote station determines that the CCCH message was not intended for the remote station, then the sequence counter must be decremented. If the remote station determines that the CCCH message was intended for the remote station, then the sequence counter remains at the incremented value. Using the embodiments described herein, the sequence counters can be turned off while in the CCCH DROP state.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for selectively processing a common control channel (CCCH) at a remote station, comprising:
   determining whether an indicator for a received message indicates that the received message is a CCCH message;
   if the received message is not a CCCH message, then processing the received message;
   if the received message is a CCCH message, then determining whether a response to a request by the remote station is expected;
   if a response to a request by the remote station is expected, then processing the CCCH message; and
   if a response to a request by the remote station is not expected, then not processing the CCCH message.

2. The method of claim 1, wherein determining whether an indicator for a received message indicates the received message as a CCCH message comprises examining a Medium Access Control (MAC) header portion of the received message.

3. The method of claim 2, wherein examining the MAC header portion comprises examining the Target Channel Type Field (TCTF) portion of the MAC header portion.

4. The method of claim 1, wherein the response to a request by the remote station is a CELL UPDATE CONFIRM message.

5. The method of claim 1, wherein the response to a request by the remote nation is a URA UPDATE CONFIRM message.

6. The method of claim 1, wherein the response to a request by the remote station is a RRC CONNECTION SETUP/REJECT message.

7. The method of claim 1, wherein the response to a request by the remote station is a RRC CONNECTION RELEASE message.

8. The method of claim 1, wherein determining whether a response to a request by the remote station is expected comprises:
   determining whether a CELL UPDATE CONFIRM message is expected;
   determining whether a URA UPDATE CONFIRM message is expected, determining whether a RRC CONNECTION SETUP/REJECT message is expected; and
   determining whether a RRC CONNECTION RELEASE message is expected, whereas the determining steps can be performed in any order.

9. The method of claim 8, further comprising:
   determining whether a timer has expired, wherein if the timer is expired, the response is unexpected.

10. An apparatus for reducing processing at a remote station, comprising:
    a memory element; and
    a processor configured to execute a set of instructions stored in the memory element, the set of instructions for:
    determining whether an indicator for a received message indicates the received message as a common control channel (CCCH) message;
    if the received message is not a CCCH message, then processing the received message;
    if the received message is a CCCH message, then determining whether a response to a request by the remote station is expected;
    if a response to a request by the remote station is expected, then processing the CCCH message; and
    if a response to a request by the remote station is not expected, then not processing the CCCH message.

11. The apparatus of claim 10, wherein the set of instructions is further for determining whether a Target Channel Type Field (TCTF) portion of a Medium Access Control (MAC) header portion of the received message indicates that the received message is a common control channel (CCCH) message.

12. The apparatus of claim 11, wherein the set of instructions for determining whether a response to a request by the remote station is expected, comprises:
    determining whether a CELL UPDATE CONFIRM message is expected;
    determining whether a URA UPDATE CONFIRM message is expected;
    determining whether a RRC CONNECTION SETUP/REJECT message is expected; and
    determining whether a RRC CONNECTION RELEASE message is expected, whereas the determining steps can be performed in any order.

13. A method for processing a common control channel (CCCH) at a remote station, comprising:
    transitioning to a first state if the remote station transmits a request to a base station, wherein the first state is for processing any message received on the CCCH; and
    transitioning to a second state if a response to the request is successfully processed by the remote station, wherein the second state is for discarding any message received on the CCCH.

14. The method of claim 13, wherein discarding any message received on the CCCH is performed by:
    examining a Target Channel Type Field (TCTF) in a Medium Access Control (MAC) header of a received message; and
    discarding the received message if the TCTF indicates that the received message is a CCCH message.

15. The method of claim 13, wherein transitioning to the second state further comprises waiting for a timer to expire before transitioning, wherein the timer is set by successfully processing of the response to the request.

16. A method for processing a common control channel (CCCH) at a remote station, comprising:
    processing any message received on the CCCH if the remote station is in a first state, wherein the remote station enters the first state if the remote stations transmits a request to a base station; and
    discarding any message received on the CCCH if the remote station is in a second state, wherein the remote station enters the second state if the remote station receives a response to a request that had been previously transmitted to a base station.

17. The method of claim 16, wherein the remote station enters the second state upon expiration of a timer, the timer started by the receipt of the response.

18. An apparatus for processing messages at a remote station, comprising:
    a memory element; and
    a processor configured to execute a set of instructions stored in the memory element, the set of instructions for:
    transitioning to a first state if the remote station transmits a request to a base station, wherein the first state is for processing any message received on the common control channel (CCCH); and
    transitioning to a second state if a response to the request is successfully processed by the remote station, wherein the second state is for discarding any message received on the CCCH.

19. The apparatus of claim 18, wherein the set of instructions are further for transitioning to the second state upon the expiration of a timer, wherein the timer is started if the response to the request is successfully processed.

20. An apparatus for processing messages at a remote station, comprising:
    a memory element; and
    a processor configured to execute a set of instructions stored in the memory element, the set of instructions for:
    processing any message received on the common control channel (CCCH) if the remote station is in a first state, wherein the remote station enters the first state if the remote stations transmits a request to a base station; and
    discarding any message received on the CCCH if the remote station is in a second state, wherein the remote station enters the second state if the remote station receives a response to a request that had been previously transmitted to a base station.

21. An apparatus for reducing processing at a remote station, comprising:
    means for determining whether an indicator for a received message indicates that the received message is a common control channel (CCCH) message and for determining whether the CCCH message is expected or unexpected;
    means for processing the received message if the received message is not a CCCH message or if the received message is an expected CCCH message; and
    means fur discarding the received message it the received message is an unexpected CCCH message.

22. An apparatus for selectively processing a common control channel (CCCH), comprising:
   means for transitioning to a first state if the remote station transmits a request to a base station;
   means for processing any messages received on the CCCH by the remote station while the remote station is in the first state;
   means for transitioning to a second state if a response to the request is successfully processed by the remote station; and
   means for discarding any messages received on the CCCH by the remote station while the remote station is in the second state.

* * * * *